July 23, 1946.   J. M. HAIT   2,404,486

AMPHIBIAN PROPULSION MECHANISM

Filed Jan. 8, 1942

INVENTOR:
JAMES M. HAIT

BY
ATTORNEY

Patented July 23, 1946

2,404,486

UNITED STATES PATENT OFFICE 2,404,486

AMPHIBIAN PROPULSION MECHANISM

James M. Hait, San Gabriel, Calif., assignor to Food Machinery Corporation, San Jose, Calif., a corporation of Delaware Application January 8, 1942, Serial No. 426,027

5 Claims. (Cl. 115—1)

This invention relates to amphibian tanks of the endless track-laying type and has for its principal object the provision of an improved propulsion mechanism for use on such tanks to transform the motive power into propulsive thrust when the tank is floating in the water.

The manner of accomplishing the foregoing object, as well as further objects and advantages, will be made manifest in the following description taken in connection with the accompanying drawing, in which.

Figure 1:
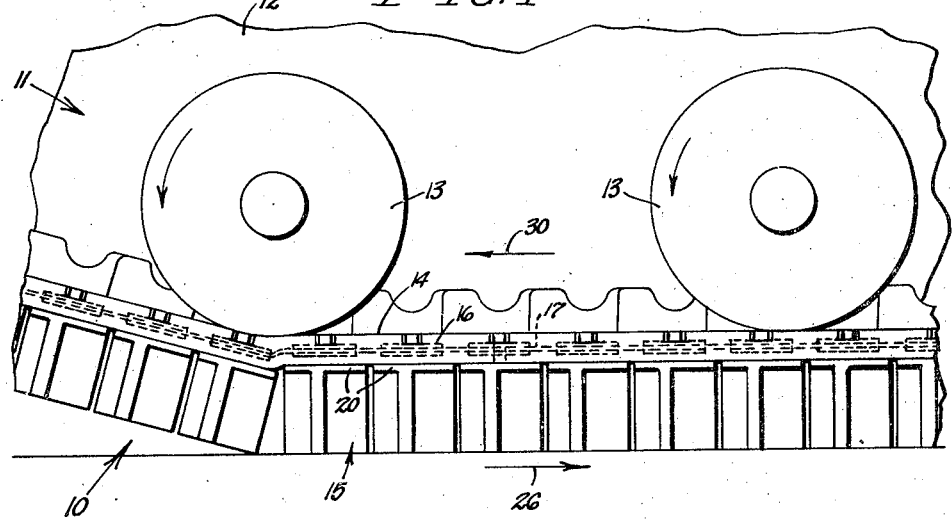
Fig. 1 is a diagrammatic fragmentary side elevational view of a preferred embodiment of the invention.

Referring specifically to the drawing, it is to be noted that I have fragmentarily and diagrammatically illustrated a propulsive mechanism 10 in Fig. 1 as applied to an amphibian tank 11. This tank includes a hull 12 equipped with suitable belt guiding and driving sprockets (not shown) and a plurality of bogie wheels 13, a set of the latter being secured to each side of the hull 12. Trained about each set of these sprockets and wheels is a flexible endless belt 14.

The belt 14 is provided with grousers 15 which extend downwardly therefrom substantially at right angles from the plane of the belt. These grousers support the belt 14 and the tank 11 when the latter is traveling on land and are depended upon, when the tank is traveling through water, to engage the water and propel the tank.

In exhaustive laboratory tests, I have found the grouser blades 15 to exhibit a high degree of efficiency. It is also to be noted that these grouser blades are adapted to be mounted in a telescoped relation which gives adequate transverse support to the belt 14 when the wheels 13 pass thereover.

The belt 14 is preferably reinforced by a series of metal clamps 16 which are imbedded in the rubber of the belt 14. The clamps 16 are clamped onto a series of endless cables 17 also imbedded in the rubber of the belt so as to prevent the stretching of the latter. It is particularly desirable in the use of this kind of a belt to have each of the clamps 16 well supported by the grouser blades when the wheels 13 ride thereover. This is accomplished by mounting each of the grouser blades 15 on a series of plates 20, each of which is disposed immediately beneath one of the metal clamps 16. These plates are located fairly close together and are rigidly secured to the belt by suitable bolts or studs which extend upwardly through the clamps 16. Each grouser 15 preferably extends across three of the plates 20.

Figure 2:
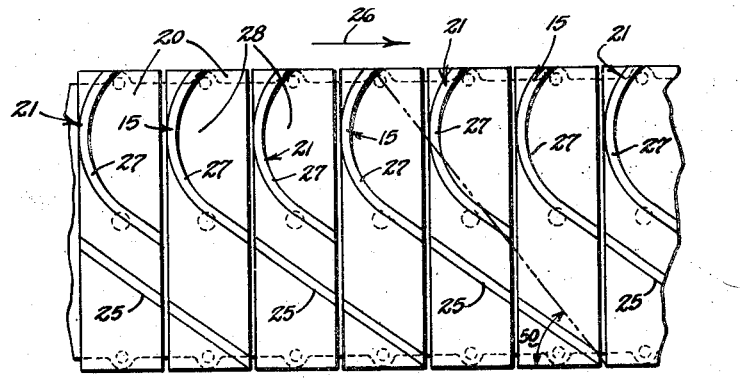
Fig. 2 is a bottom plan view of Fig. 1.

While these grousers 15 may be employed without any intermediate grousers disposed therebetween, it has been found expedient to place a half grouser 21 on the middle plate of each set of three required for supporting a complete grouser 15. The relation of the grousers 15 and half grousers 21 are clearly shown in Fig. 2. It is to be noted that each grouser 15 has a straight portion 25 which is relatively long and disposed at a sharply acute angle relative to the direction of travel of the grousers on the belt 14, as indicated by arrows 26. Toward its outer or rear end each grouser 15 has a curved portion 27 forming a reaction cup 28.

When the tank 11 is floating in water, and the belts 14 are driven in the direction indicated by the arrows 26, the grousers 15 and half grousers 21 operate to propel the tank through the water in the direction of the arrow 30. This is accomplished by the straight portions 25 of the grousers causing a rapid flowing of water therebetween.

The straight blade portions 25 offer relatively little resistance to this water movement. The masses of water thus set in motion however are caught within the cups 28 formed by the curved portions 27 of the grousers 15 and in the half grousers 21 to cause a reaction which throws this water downward and toward the rear. This sets up a relatively high resistance to travel of the belts 14 in the direction of the arrow 26. This naturally increases the thrust imparted to the hull 12 of the tank 11 in the direction of the arrow 30.

In my experiments I have noticed that the grousers 15 have a marked superiority in performance when placed at approximately 50 degrees with respect to the side of the tank 11, over the performance that these blades have when they are placed with the chord thereof at right angles to the side of the tank.

Maximum efficiency is attained with the grouser 15 when the substantially straight portion 25 is relatively long as shown in the drawing. This length would make this grouser impractical for use on an amphibian were it not for the feature of dividing each grouser transversely into sections capable of articulation relative to each other. This permits the grouser to readily pass around the idle and driven sprockets (not shown) and the bogie wheels, adapt itself to uneven terrain, and supply uniform and adequate support for the bogie wheels of the tank.

While a belt as described is preferred as a tank supporting and track-laying element, the term "belt" is here employed in the generic sense which also embraces chain belts and flexible endless elements generally.

What I claim is:

1. In an amphibian propulsion mechanism, the combination of: an endless belt; means for mounting said belt on said amphibian for annular movement; and a series of propulsion grousers on said belt, each grouser being disposed with the tip to tip chord thereof at an acute angle with the direction of movement of said grousers on said belt, the most forwardly disposed portion of each grouser being relatively long and substantially straight and disposed at a smaller angle with respect to said direction than said chord, while the rearmost portion of said grouser is relatively sharply curved toward the direction of movement of said grousers.

2. In an amphibian propulsion mechanism, the combination of: an endless belt; means for mounting said belt on said amphibian for annular movement; and a series of propulsion grousers on said belt, each grouser being disposed with the tip to tip chord thereof at an acute angle of from about 40 to 60 degrees with the direction of movement of said grousers on said belt, the most forwardly disposed portion of each grouser being relatively long and substantially straight and disposed at a smaller angle with respect to said direction than said chord, while the rearmost portion of said grouser is relatively sharply curved toward the direction of movement of said grousers.

3. In an amphibian propulsion mechanism, the combination of: an endless belt; means for mounting said belt on said amphibian for annular movement; and a series of propulsion grousers on said belt, each grouser being disposed with the tip to tip chord thereof at an acute angle of approximately 50 degrees with the direction of movement of said grousers on said belt, the most forwardly disposed portion of each grouser being relatively long and substantially straight and disposed at a smaller angle with respect to said direction than said chord, while the rearmost portion of said grouser is relatively sharply curved toward the direction of movement of said grousers.

4. A combination as in claim 1 in which a semi-grouser comprising a curved blade substantially like the curved portion of the aforesaid grouser is disposed between adjacent pairs of the aforesaid grousers in positions corresponding to the positions of the curved portions of the aforesaid grousers, the space between straight portions of adjacent grousers being substantially unobstructed.

5. A combination as in claim 1 in which said grousers are divided transversely of the direction in which they travel each grouser being divided into a plurality of sections, said sections being adapted to articulate one relative to the other when said belt bends around a turning axis.

JAMES M. HAIT.